(12) United States Patent
Ulvinen et al.

(10) Patent No.: US 6,393,305 B1
(45) Date of Patent: May 21, 2002

(54) SECURE WIRELESS COMMUNICATION USER IDENTIFICATION BY VOICE RECOGNITION

(75) Inventors: Vesa Ulvinen, Oulu; Jari Paloniemi, Kiiminki, both of (FI)

(73) Assignee: Nokia Mobile Phones Limited

( * ) Notice: Subject to any disclaimer, the term of this patent is extended or adjusted under 35 U.S.C. 154(b) by 0 days.

(21) Appl. No.: 09/326,717

(22) Filed: Jun. 7, 1999

(51) Int. Cl.[7] .......................... H04M 1/00; G10L 15/00
(52) U.S. Cl. .................... 455/563; 455/566; 455/411; 379/88.02; 704/246; 704/273
(58) Field of Search ................................ 455/563, 566, 455/411, 410, 550, 575; 379/88.02, 88.01, 88.03, 93.03; 704/231, 246, 251, 247, 252, 273; 380/247, 270

(56) References Cited

U.S. PATENT DOCUMENTS

| | | | |
|---|---|---|---|
| 5,640,485 A | 6/1997 | Ranta | 704/251 |
| 5,692,032 A | 11/1997 | Seppanen et al. | 455/466 |
| 5,774,525 A * | 6/1998 | Kanevsky et al. | 379/88.02 |
| 5,794,142 A | 8/1998 | Vanttila et al. | 455/419 |
| 5,805,674 A * | 9/1998 | Anderson, Jr. | 704/273 |
| 5,845,205 A | 12/1998 | Alanara et al. | 455/564 |
| 5,870,683 A | 2/1999 | Wells et al. | 455/566 |
| 5,897,616 A * | 4/1999 | Kanevsky et al. | 704/723 |
| 5,903,832 A | 5/1999 | Seppanen et al. | 455/414 |
| 6,161,090 A * | 12/2000 | Kanevsky et al. | 704/273 |
| 6,185,536 B1 * | 2/2001 | Haber et al. | 704/273 |
| 6,263,311 B1 * | 7/2001 | Dildy | 704/273 |

* cited by examiner

Primary Examiner—William Trost
Assistant Examiner—Rafael Perez-Gutierrez
(74) Attorney, Agent, or Firm—Harrington & Smith LLP

(57) ABSTRACT

A method to authorize or authenticate a user of a wireless telecommunication system (32), and includes steps of (a) selecting a word at random from a set of reference words, or synthesizing a reference word; (b) prompting the user to speak the reference word; and (c) authenticating the user to operate in, or through, or with a resource reachable through the wireless telecommunication system, only if the user's speech characteristics match pre-stored characteristics associated with the reference word. In one embodiment the steps of selecting or synthesizing, prompting, and authenticating are performed in a mobile station (10) having a speech transducer (19) for inputting the user's speech, while in another embodiment at least one of the steps of selecting or synthesizing, prompting, and authenticating are performed in a wireless telecommunications network (32) that is coupled between the mobile station and a telephone network (35). In yet another embodiment at least one of these steps are performed in a data communications network resource (38) that is coupled through a data communications network (37), such as the Internet, and the wireless telecommunications network to the mobile station. The step of prompting may include a step of displaying alphanumeric text and/or a graphical image to the user using a display (20) of the mobile station.

26 Claims, 3 Drawing Sheets

SECURE WIRELESS COMMUNICATION USER IDENTIFICATION BY VOICE RECOGNITION

FIELD OF THE INVENTION

This invention relates generally to biometric systems and methods and, in particular, to systems that identify a speaker by the automatic recognition of the speaker's voice and, more particularly, to a wireless telecommunications system employing voice recognition.

BACKGROUND OF THE INVENTION

Biometric systems typically employ and measure some physical characteristic of a particular individual to uniquely identify that individual. The characteristic could be, by example, a fingerprint, a retinal pattern, or a voice pattern. The use of this latter characteristic is especially attractive for those systems that already include a microphone, such as telecommunications system, as no hardware expense may need to be incurred in order to implement the identification system. After having uniquely identified a speaker as being a particular, authorized individual, the system can then grant the speaker access to some location or to some resource. That is, this type of biometric system can be viewed as an electronic, voice actuated lock.

One problem that arises in many such systems is that the system is trained to recognize a particular speaker using a limited set of spoken words. For example, the speaker may be expected to say his or her name, and/or some predetermined password. While this approach may be suitable for many applications, in other applications the limited set of words used for identification may not be desirable, and may in fact lead some other persons to attempt to defeat the voice recognition-based biometric system. For example, a person attempting to defeat the system may simply surreptitiously tape record a person speaking the word or words that the biometric system expects to be spoken, and then play back the authorized person's speech to the voice input transducer of the biometric system.

It is well known in the mobile telecommunications art to provide a mobile telephone, such as a vehicle-installed cellular telephone, with a voice recognition capability in order to replace or augment the normal user input device(s). For example, the user can dial a number by speaking the digits, or by speaking a name having a stored telephone number. Some commands could be given to the telephone in the same manner.

In general, current user identification methods are based on measuring one static feature: e.g., a written password, a spoken password (voice recognition), a fingerprint, an image of the eye and so on. In the identifying situation the user knows what is measured and how.

OBJECTS OF THE INVENTION

It is an object of this invention to provide an improved biometric system, in particular a voice actuated recognition system, that relies on a random set of words and or images.

It is a further object of this invention to provide a mobile station having a speech transducer, and a method and apparatus to authenticate or authorize a user of a wireless telecommunication system to operate in, or through, or with a resource reachable through the wireless telecommunication system, only if the user's speech characteristics match pre-stored characteristics associated with word selected randomly from a training set of words.

SUMMARY OF THE INVENTION

The foregoing and other problems are overcome and the objects of the invention are realized by methods and apparatus in accordance with embodiments of this invention.

According to this invention, when a user enters an identifying situation he or she does not know beforehand what the identification stimulus will be and, thus, what the user's reaction or response will be. Using current technology a most straightforward way to implement the invention is with voice recognition. In this case the user is presented with a voice stimulus, or a text stimulus, or a graphical image stimulus, and the user reacts with his or her voice. The stimulus can be direct (e.g., the user speaks a displayed word) or indirect (e.g., the user responds to a question that only the user knows the answer to). Since even the correct user does not know beforehand the details of the identification situation, it becomes very difficult or impossible to know beforehand what the expected correct response will be.

A method is disclosed to authorize or authenticate a user of a wireless telecommunication system, and includes steps of (a) selecting a word at random from a set of reference words, or synthesizing a random reference word; (b) prompting the user to speak the reference word; and (c) authenticating the user to operate in, or through, or with a resource reachable through the wireless telecommunication system, only if the user's speech characteristics match predetermined characteristics associated with the reference word.

In one embodiment the steps of selecting or synthesizing, prompting, and authenticating are performed in a mobile station having a speech transducer for inputting the user's speech, while in another embodiment at least one of the steps of selecting or synthesizing, prompting, and authenticating are performed in a wireless telecommunications network that is coupled between the mobile station and a telephone network. In yet another embodiment at least one of the steps of selecting or synthesizing, prompting, and authenticating are performed in a data communications network resource that is coupled through a data communications network, such as the Internet, and the wireless telecommunications network to the mobile station.

The step of prompting may include a step of displaying alphanumeric text and/or a graphical image to the user using a display of the mobile station.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
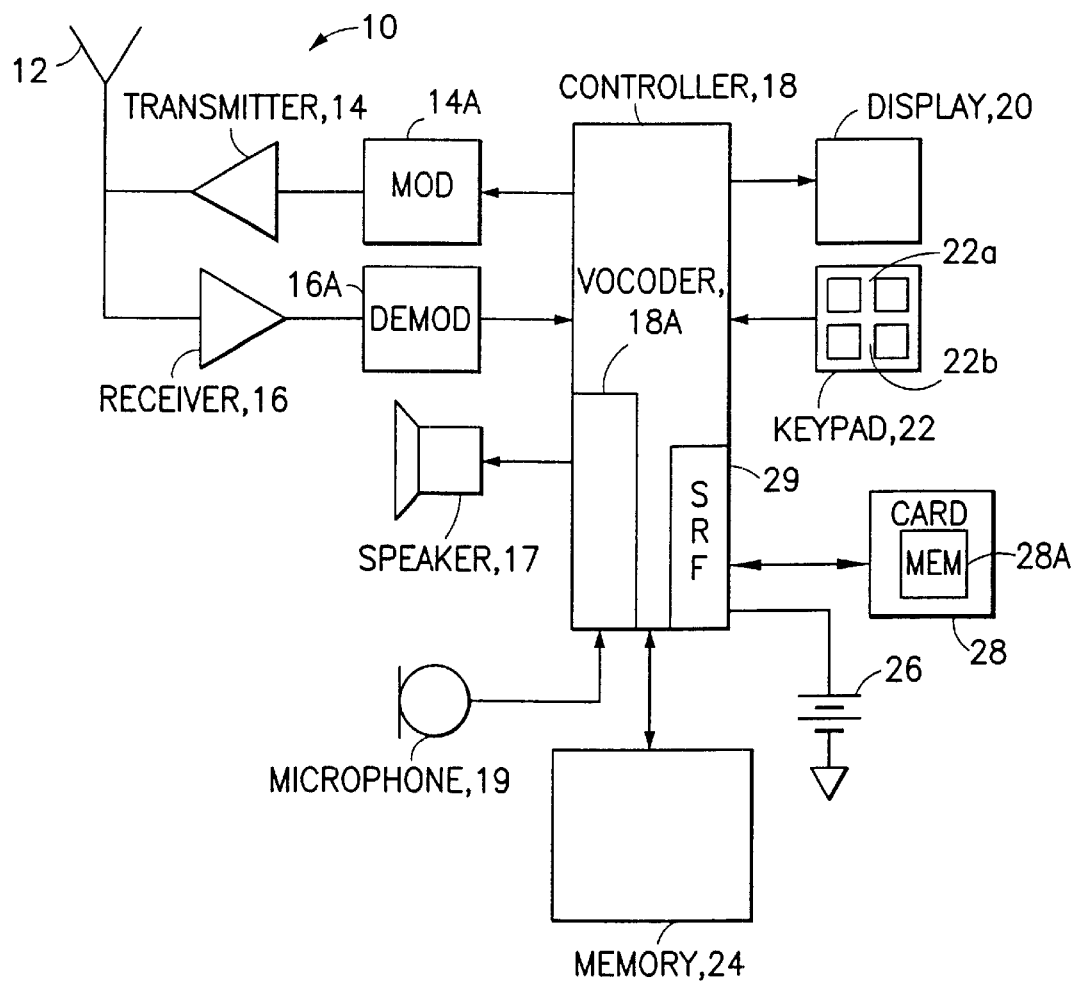
FIG. 1 is a block diagram of a mobile station that is constructed and operated in accordance with this invention.
Figure 2:
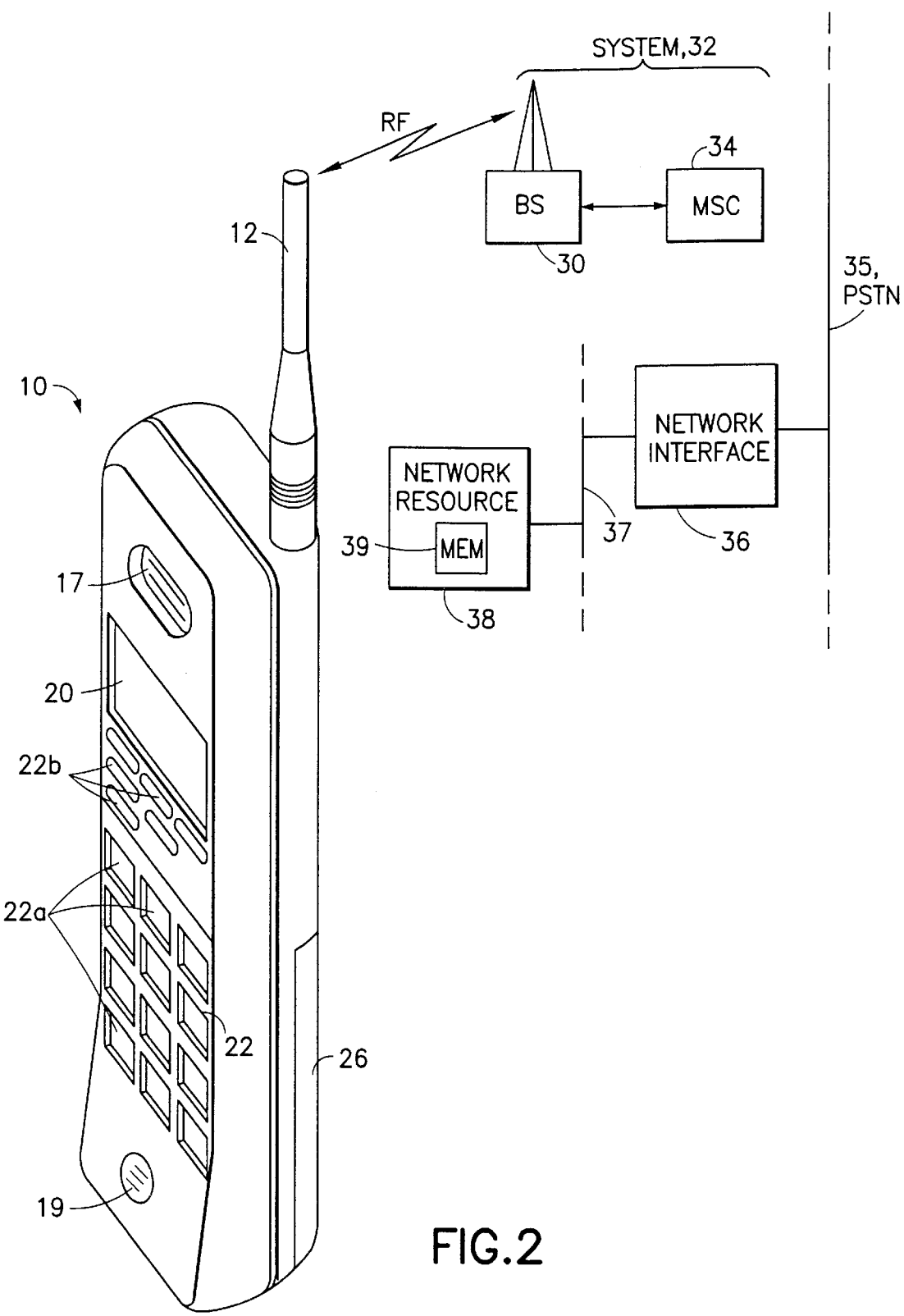
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a wireless telecommunications network or system 32, that may include a mobile switching center (MSC) 34. The MSC 34 provides a connection to landline trunks, such as the public switched telephone network (PSTN) 35, when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signaling information in accordance with the air interface standard of the applicable cellular system, and also user speech and/or user generated data. The particular air interface standard and/or access type is not germane to the operation of this system, as mobile stations and wireless systems employing most if not all air interface standards and access types (e.g., TDMA, CDMA, FDMA, etc.) can benefit from the teachings of this invention.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station 10 are allocated between these devices according to their respective capabilities. In many embodiments the mobile station 10 will include a voice encoder/decoder (yocoder) 18A of any suitable type.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station. The mobile station 10 also includes various memories, shown collectively as the memory 24, wherein are stored a plurality of constants and variables that are used by the controller 18 during the operation of the mobile station. The memory 24 may also store all or some of the values of various wireless system parameters and the number assignment module (NAM). An operating program for controlling the operation of controller 18 is also stored in the memory 24 (typically in a ROM device).

In accordance with the teachings of this invention, the controller 18 includes a speech recognition function (SRF) 29 that receives digitized input that originates from the microphone 19, and which is capable of processing the digitized input and for comparing the characteristics of the user's speech with pre-stored characteristics stored in the memory 24. If a match occurs then the controller 18 is operable to grant the speaker access to some resource, for example to a removable electronic card 28 which authorizes or enables the speaker to, in a typical application, make a telephone call from the mobile station 10. For example, the subscriber data required to make a telephone call, such as the Mobile Identification Number (MIN), and/or some authentication-related key or other data, can be stored in the card 28, and access to this information is only granted when the user speaks a word or words that are expected by the SRF 29, and which match predetermined enrollment (training) data already stored in the memory 24.

Further in accordance with this invention, the training data could as well be stored in some other memory, such as a memory 28A within the card 28, or in a memory 32A located in the system 32 (FIG. 3), or in some remote memory that is accessible through the system 32. For example, and referring specifically to FIG. 2, a memory 39 storing the training data set could be located in a data communications network (e.g., the Internet) entity or resource 38, which is accessible from the PSTN 35 through a network interface 36 (e.g., an Internet Service Provider or ISP), and a local area or wide area data communications network 37 (e.g., the Internet). In this case it can be appreciated that at least some of the data is packetized and sent in TCP/IP format.

In general, the identification system and software, as well as the prestored speech samples and characteristics may be located in the mobile station 10, in a server of the network 37 or the system 32, or in the system of a service provider.

In accordance with the an aspect of this invention the user can be prompted to speak one or a set of words, with the specific word to be spoken being selected randomly from the set of known words by the SRF 29. Assuming that the set of known words has a non-trivial number of elements, then it becomes difficult for another person to defeat the SRF 29 by recording a word or words expected to be spoken by the user.

The user can be prompted to speak the selected word or words in various ways. In a simplest way the SRF 29 displays the selected word on the display 20. Alternatively, the SRF 29 can use a speech synthesizer and the mobile station's speaker 17 to audibly prompt the user for the word to be spoken. In another embodiment the display 20 is used to present some graphical image corresponding to a word to be spoken (e.g., a tree). In a further embodiment some generic graphical image is used to suggest to the user a predetermined word to be spoken, and that was previously agreed upon during the training or enrollment stage. For example, it can be agreed upon that when presented with the graphical image of a tree the user will speak the word "birch", and that when presented with a graphical image of a city skyline the user will speak the word "Chicago". In this latter embodiment, and even if an unauthorized person where to gain possession of the user's mobile station 10, it is unlikely that the unauthorized person will give the correct reply word when presented with a particular graphical image or icon, let alone speak the reply word in a manner that would be recognized by the SRF 29 as a valid response.

If the set of training words are stored in the mobile station 10, whether in the memory 24 or the card 28, the words can be encrypted to prevent unauthorized access and/or modification.

Figure 3:
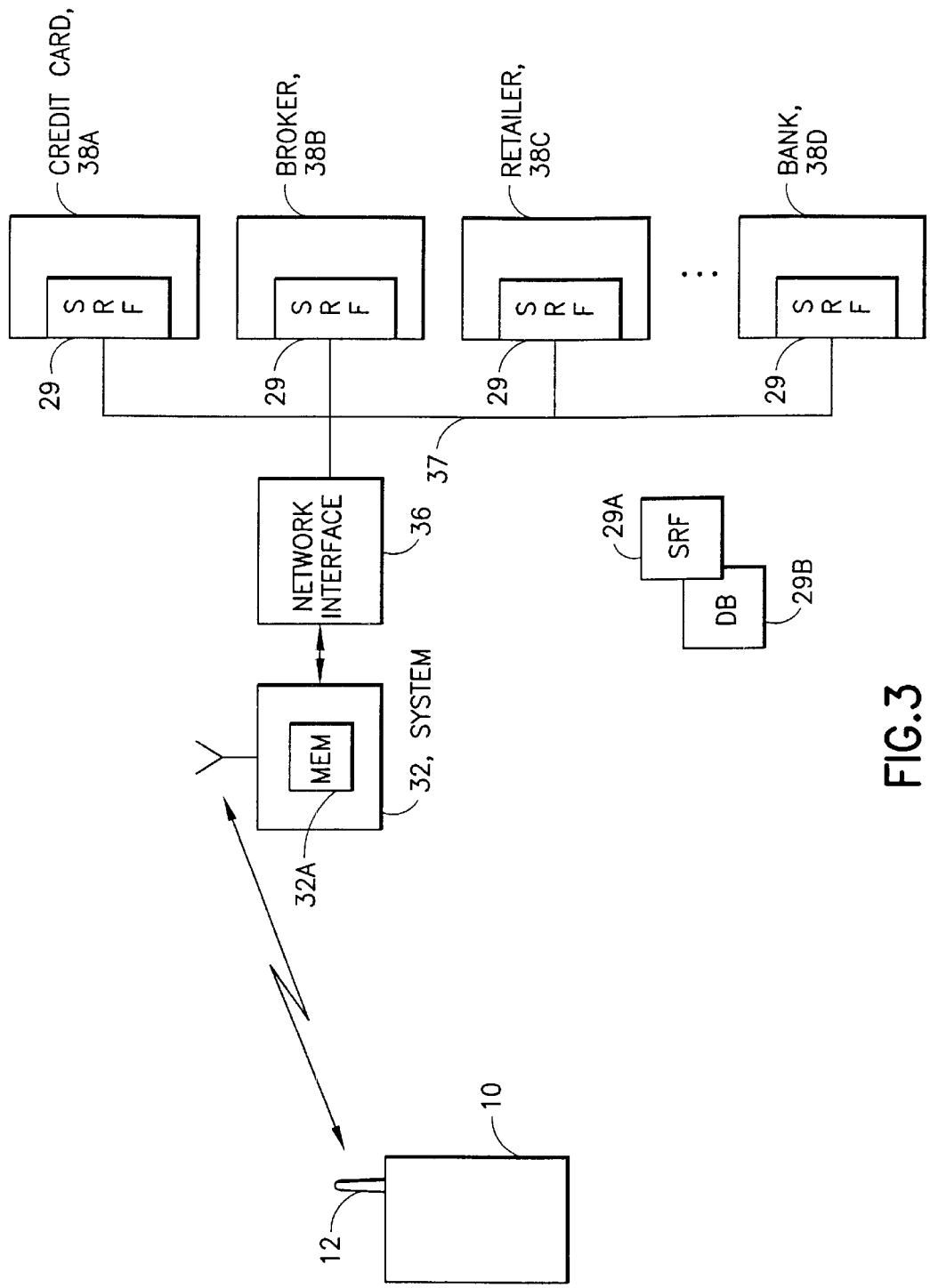
FIG. 3 is block diagram that shows in greater detail a plurality of data communications network resources in accordance with further embodiments of this invention.

Referring to FIG. 3, it can also be appreciated that the SRF 29 can be resident outside of the mobile station 10, such as at one or more network entities or resources 38A–38D (e.g., a credit card supplier, stock broker, retailer, or bank.) In this embodiment, and assuming for example that the user wishes to access his account at the bank 38D, the SRF 29 signals back to the mobile station 10 a randomly selected word to be spoken by the user, via the network 37, network interface 36, and wireless system 32. The user speaks the word and, in one embodiment, the spectral and temporal characteristics of the user's utterance are transmitted from the mobile station 10 as a digital data stream (not as speech per se) to the SRF 29 of the bank 38D for processing and comparison. In another embodiment the user's spoken utterance is transmitted in a normal manner, such as by transmitting voice encoder/decoder (vocoder 18A) parameters, which are converted to speech in the system 32. This speech is then routed to the SRF 29 of the bank 38D for processing and comparison. It should be noted that the spectral and temporal characteristics transmitted in the first embodiment could be the vocoder 18A output parameters as well, which are then transmitted on further to the SRF 29 of the bank 38D, without being first converted to a speech signal in the system 32. In this case the necessary signaling protocol must first be defined and established so that the system 32 knows to bypass its speech decoder.

It is also within the scope of the teaching of this invention to provide a centralized SRF 29A, whose responsibility it is to authenticate users for other locations. For example, assume that the user of the mobile station 10 telephones the bank 38D and wishes to access an account. In this case the user authentication process is handled by the intervention of the SRF 29A which has a database (DB) 29B of recognition word sets and associated speech characteristics for a plurality of different users. The SRF 29A, after processing the user's speech signal, signals the bank 38D that the user is either authorized or is not authorized. This process could be handled in several ways, such as by connecting the user's call directly to the SRF 29A, or by forwarding the user's voice characteristics from the bank 38D to the SRF 29A. In either case the bank 38D is not required to have the SRF 29, nor are the other network resources 38A–38C.

It should be noted that the set of recognition words stored in the DB 29B could be different for every user. It should be further noted that this process implies that at some time the user interacts with the SRFs 29, or just with the SRF 29A, in order to execute an enrollment or training process whereby the user's database entries (set of recognition words and the associated speech temporal and spectral characteristics) are created. As was noted above, at least some of these speech characteristics could be based on or include voice encoder 18A parameters.

As an exemplary embodiment of this invention about 20–50 prestored voice samples can be used, and the stimulus and the sample are randomly or pseudorandomly selected among these (e.g., text-dependent speaker verification). In that the user records the samples himself or herself, the connection between the stimulus and the sample may be meaningful only for the user. Also, due to the provided stimulus the user is not required to memorize one or more passwords or numeric codes. Furthermore, there can be different sets of samples for different network services. For example, one set of samples may be used to obtain access to a network e-mail facility, while another set of samples may be used to obtain access to a network voice mail facility. As employed herein the term "random" is considered to encompass both truly random as well as pseudorandom.

For the case where speech synthesizing techniques improve sufficiently, it is also possible that the prestored samples are not required, but instead the system creates one or more synthesized reference word(s) that are compared to the user's voice response (text-independent speaker verification). The generated reference word is preferably generated randomly or pseudorandomly.

Furthermore, it should be appreciated that the teachings of this invention could be combined with the use of one or more other types of identification systems and techniques, such as fingerprint identification. Also, various ones of the stimulus types described above could be used in combination. For example, the user may be presented with a randomly selected or generated alphanumeric string that the user is expected vocalize, as well as with a related or totally unrelated graphical image to which the user is expected to verbally respond.

While the invention has been described in the context of preferred and exemplary embodiments, it should be realized that a number of modifications to these teachings may occur to one skilled in the art. By example, any suitable speech processing techniques that are known for use in speech recognition systems can be employed, and the teachings of this invention are not limited for use to any specific technique.

Furthermore, while the user may be prompted to speak a reference "word", it can be appreciated that the "word" may actually be a phrase comprised of a plurality of words and also possibly numbers (e.g., a date, or an address).

Thus, while the invention has been particularly shown and described with respect to preferred embodiments thereof, it will be understood by those skilled in the art that changes in form and details may be made therein without departing from the scope and spirit of the invention.

What is claimed is:

1. A data communications system comprising a wide area data communications network that is bidirectionally coupled to a mobile station through a wireless telecommunication system, said wide area data communications network comprising a plurality of unrelated servers that are accessible by a user of said mobile station, said wide area data communications network comprising at least one user authentication server that functions to authenticate the user prior to the user being granted access to an individual one of said plurality of unrelated servers and for signaling to a selected one of said plurality of unrelated servers that the user is an authenticated user, said user authentication server having access to a database that stores data representing prerecorded user speech characteristics that are obtained from the user in response to a set of reference stimuli, and comprising a comparison function, responsive to the user attempting to access a selected one of said plurality of unrelated servers, for causing the user to be presented with at least one of the reference stimuli, for receiving data from the wireless telecommunication system that is expressive of the user's vocal response to the presented at least one reference stimuli, for comparing the received data to corresponding prerecorded user speech characteristics in said database and, upon a match occurring, for signaling the selected one of the plurality of unrelated servers that the user is an authenticated user.

2. A data communications system as in claim 1, wherein said authentication server causes said user to be presented with a graphical image on a visual display of said mobile station, said graphical image being one of said plurality of reference stimuli and selected to elicit from the user a vocal response that is other than a generic name for an object that is represented by said graphical image.

3. A data communications system as in claim 1, wherein said wide area data communications network comprises the Internet.

4. A wireless telecommunication system, comprising:
   at least one base station;
   at least one mobile station comprising a transceiver for conducting wireless communications with said base station, said mobile station further comprising a user interface that includes a visual display and a microphone for inputting a users's speech;
   a first subsystem coupled to said user interface for prompting the user to speak a reference word that is randomly selected from a set of reference words, or that is randomly generated, said first subsystem operating so as to present the user with a graphical image on said visual display that has been predetermined to elicit a predetermined response from the user that is the selected word; and a second subsystem coupled to said microphone for authenticating the mobile station to operate in the wireless telecommunications system, or through the wireless telecommunications system, or with a resource that is reachable through the wireless telecommunication system, only if the user's speech characteristics match expected characteristics associated with the reference word.

5. A system as in claim 4, wherein said mobile station further comprises a voice digitizing and processing system, and wherein said first subsystem further comprises means for transmitting an output of said voice digitizing and processing system to said base station, and wherein at least said second subsystem is located external to said mobile station.

6. A system as in claim 4, wherein one or both of the first and second subsystems are located in one of the mobile station, in the base station or in a controller coupled to the base station, or in a data communications network entity that is coupled through a data communications network to the wireless telecommunications system.

7. A system as in claim 6, wherein the data communications network is comprised of the Internet.

8. A system as in claim 4, wherein at least said second subsystem is located in a network entity that is coupled to a data communications network that is bidirectionally coupled to said system.

9. A system as in claim 4, wherein the selected word that is elicited from the user as the predetermined response is other than a generic name for an object that is represented by said graphical image.

10. A system as in claim 4, wherein the first subsystem employs said user interface to also present alphanumeric text to the user using said display of said mobile station.

11. A method to authenticate a user of a wireless telecommunication system, comprising steps of:

selecting a phrase from a set of reference phrases, the selected phrase comprising at least one word;

prompting the user to speak the selected phrase by presenting the user with a graphical image that has been predetermined to elicit the selected phrase from the user; and authenticating the user to operate in, or through, or with a resource reachable through the wireless telecommunication system, only if the user's speech characteristics match characteristics associated with the selected phrase.

12. A method as in claim 11, wherein at least one of the steps of selecting, prompting, and authenticating are performed in a data communications network resource that is coupled through a data communications network and a wireless telecommunications network to a mobile station having a speech transducer for inputting the user's speech.

13. A method as in claim 12, wherein the data communications network is comprised of the Internet.

14. A method as in claim 11, wherein at least one of the steps of selecting, prompting, and authenticating are performed in a wireless telecommunications network coupled between a mobile station having a speech transducer for inputting the user's speech and a telephone network.

15. A method as in claim 11, wherein the step of prompting further includes a step of displaying alphanumeric text to the user using a display of a mobile station having a speech transducer for inputting the user's speech.

16. A method as in claim 11, wherein the selected phrase that is elicited from the user as the predetermined response is other than a generic name for an object that is represented by said graphical image.

17. A method as in claim 11, wherein the step of prompting presents the graphical image to the user using a display of a mobile station having a speech transducer for inputting the user's speech.

18. A method as in claim 11, wherein the steps of selecting, prompting, and authenticating are performed in a mobile station having a speech transducer for inputting the user's speech.

19. A method to authenticate a user of a wireless telecommunication system, comprising steps of:

selecting a word at random from a set of reference words;

prompting the user to speak the selected word by presenting the user with a graphical image that has been predetermined to elicit a predetermined response from the user that is the selected word; and authenticating the user to operate in, or through, or with a resource reachable through the wireless telecommunication system, only if the user's speech characteristics match pre-stored characteristics associated with the selected word.

20. A method as in claim 19, wherein at least one of the steps of selecting, prompting, and authenticating are performed in a data communications network resource that is coupled through a data communications network and a wireless telecommunications network to a mobile station having a speech transducer for inputting the user's speech.

21. A method as in claim 20, wherein the data communications network is comprised of the Internet.

22. A method as in claim 19, wherein at least one of the steps of selecting, prompting, and authenticating are performed in a wireless telecommunications network coupled between a mobile station having a speech transducer for inputting the user's speech and a telephone network.

23. A method as in claim 19, wherein the step of prompting further includes a step of displaying alphanumeric text to the user using a display of a mobile station having a speech transducer for inputting the user's speech.

24. A method as in claim 19, wherein the selected word that is elicited from the user as the predetermined response is other than a generic name for an object that is represented by said graphical image.

25. A method as in claim 19, wherein the step of prompting presents the graphical image to the user using a display of a mobile station having a speech transducer for inputting the user's speech.

26. A method as in claim 19, wherein the steps of selecting, prompting, and authenticating are performed in a mobile station having a speech transducer for inputting the user's speech.

* * * * *